United States Patent [19]

Doerge

[11] Patent Number: 5,057,547

[45] Date of Patent: Oct. 15, 1991

[54] RIGID FOAMS USING BLENDS OF CHLOROFLUOROCARBONS AND HYDROCARBONS AS BLOWING AGENT

[75] Inventor: Herman P. Doerge, Pittsburgh, Pa.

[73] Assignee: Mobay Corporation, Pittsburgh, Pa.

[21] Appl. No.: 505,867

[22] Filed: Apr. 6, 1990

[51] Int. Cl.$^5$ .............................................. C08V 9/14
[52] U.S. Cl. ........................... 521/131; 252/DIG. 9; 264/DIG. 5; 521/98; 521/910
[58] Field of Search ............... 521/98, 131, DIG. 90; 264/DIG. 5; 252/DIG. 9

[56] References Cited

U.S. PATENT DOCUMENTS

| | | | |
|---|---|---|---|
| 2,524,825 | 8/1960 | Rill Jr. | 260/2.5 |
| 3,072,582 | 1/1963 | Frost | 260/2.5 |
| 3,091,551 | 5/1963 | Robertson | 117/105.5 |
| 3,153,002 | 10/1964 | Wismer et al. | 260/2.5 |
| 3,249,546 | 5/1966 | Eiseman Jr. | 252/67 |
| 3,391,093 | 7/1968 | Frost | 260/2.5 |
| 3,745,203 | 7/1973 | Harper | 264/48 |
| 3,846,347 | 11/1974 | Satterly | 260/2.5 AF |
| 4,055,507 | 10/1977 | Dastur et al. | 252/162 |
| 4,055,521 | 10/1977 | Taub et al. | 260/2.5 AF |
| 4,076,644 | 2/1978 | Burt | 252/182 |
| 4,248,975 | 2/1981 | Satterly | 521/110 |
| 4,795,763 | 1/1989 | Gluck et al. | 521/99 |

FOREIGN PATENT DOCUMENTS

| | | |
|---|---|---|
| 1288312 | 1/1969 | Fed. Rep. of Germany . |
| 1141995 | 11/1987 | Japan . |
| 1141996 | 11/1987 | Japan . |

OTHER PUBLICATIONS

Dishart and Creazzo "The DuPont Program on Fluorocarbon Alternative Blowing Agents for Polyurethane Foams"—pp. 59–66.

*Primary Examiner*—Morton Foelak
*Attorney, Agent, or Firm*—Joseph C. Gil; Lyndanne M. Whalen

[57] ABSTRACT

The present invention is directed to the use of a mixture of specific chlorofluorocarbons and specific hydrocarbons in the production of rigid, closed cell foams.

3 Claims, No Drawings

RIGID FOAMS USING BLENDS OF CHLOROFLUOROCARBONS AND HYDROCARBONS AS BLOWING AGENT

BACKGROUND OF THE INVENTION

The use of trichloromonofluoromethane ("CFC-11") in the production of closed cell, rigid polyurethane and polyisocyanurate foams is well known (see, e.g., U.S. Pat. Nos. 3,072,582; 3,091,551; 3,153,002; 3,524,825; 3,846,347; and 4,248,975). Recently, the urethane foam industry has been investigating methods for reducing the amount of CFC-11 used in producing rigid foams.

U.S. Pat. No. 3,745,203 describes the production of polyurethane moldings using a mixture of two volatile blowing agents. The least volatile of the blowing agents has a boiling point of from 30° F. to 120° F., while the more volatile blowing agent in the mixture has a boiling point of from −50° F. to 500° F. The difference between the boiling points of the two blowing agents in the mixture is from 30° F. to 150° F.

German Auslegeschrift 1,288,312 describes the use of an azeotrope of CFC-11 and isopentane as a blowing agent (U.S. Pat. No. 3,249,546 describes the azeotrope itself). o blowing agent U.S. Pat. No. 4,055,521 describes a which is a mixture of CFC-11, isopentane, and methylene chloride.

U.S. Pat. No. 3,391,093 describes the use of halogenated blowing agents which generally have boiling points below about 80° F. for producing polyurethane foams. The reference does indicate that low molecular weight hydrocarbon gases can be used with the halogenated blowing agents. U.S. Pat. No. 4,795,763 broadly indicates that mixtures of halohydrocarbons and hydrocarbons can be used as blowing agents for polyurethane foams.

It has also been suggested that 2,2-dichloro-1,1,1-trifluoroethane ("HCFC-123") and 1,1-dichloro-1-fluoroethane ("HCFC-141") can be used as blowing agents for rigid polyurethane foams (See, e.g., Dishart et al, "The DuPont Program on Fluorocarbon Alternative Blowing Agents for Polyurethane Foams," POLYURETHANES WORLD CONGRESS 1987-SEPT. 29–OCT. 2, 1987, pages 59–66, and U.S. Pat. No. 4,076,644).

The use of a mixture of a chlorofluorocarbon having an atmospheric boiling point of from about 74° F. to about 120° F. and an alkyl alkanoate having a molecular weight of no more than about 88 as a blowing agent has been described in U.S. application Ser. No. 321,032, filed on Mar. 9, 1989. Among the chlorofluorocarbons described are HCFC 123 and HCFC 141b. Among the alkyl alkanoates described is methyl formate.

. Finally, various compositions based on halogenated hydrocarbons are known for use as cleaning solvents. For example, U.S. Pat. No. 4,055,507 describes the use of an azeotropic mixture of 1,2-dichloro-1,1-difluoroethane and 3-methylpentane. Japanese 1,141,995 (abstract only) describes an azeotropic mixture of 67 to 87% by weight of HCFC-123 and 13 to 33% by weight of 2-methylbutane. Japanese 1,141,996 (abstract only) describes an azeotropic mixture of HCFC-141b and a member selected from the group n-pentane, 2-methylbutane and 2,2-dimethylbutane.

DESCRIPTION OF THE INVENTION

The present invention is directed to the discovery that a mixture of specific hydrochlorofluorocarbons with specific hydrocarbons is eminently suitable for the production of closed cell, rigid foams. The resultant foams are substantially lower in density than foams produced from trichloromonofluoromethane alone, yet still have relatively low K-factors. Additionally, since the hydrocarbons will have no ozone depletion potential, the ozone depletion potential of the hydrochlorofluorocarbons used herein will be lowered. More particularly, the present invention is directed to an improved process for the preparation of closed cell rigid foams. The process broadly comprises reacting a) a polyol component having a hydroxyl number of from about 200 to about 650, and b) an organic polyisocyanate, in the presence of c) a catalyst, d) a foam stabilizer, and e) a blowing agent. The improvement resides in the use of a mixture of i) from 30 to 95 percent by weight, and preferably from 60 to 90 percent by weight, of a hydrochlorofluorocarbon selected from the group consisting of 2,2-dichlor-1,1,1-trifluoroethane (b.p about 82° F.) and 1,1-dichloro-1-fluoroethane (b.p. about 90° F.) and ii) from 5 to 70 percent by weight, and preferably from 10 to 40 percent by weight, of a hydrocarbon selected from the group consisting of n-pentane, 2-methylbutane, hexane, the position isomers of hexane and mixtures thereof. The most preferred mixture consists of 2,2-dichloro-1,1,1-trifluoroethane and n-pentane. If desired, the blowing agent can also contain water.

The polyols, isocyanates, catalysts, and foam stabilizers useful herein and the various methods of combining them to produce closed cell, rigid foams are generally known in the art.

The invention is further illustrated but is not o intended to be limited by the following examples in which all parts and percentages are by weight unless otherwise specified.

EXAMPLES

In the examples which follow, the following materials were used:

POLYOL A: a 460 OH number polyol prepared by sequentially reacting 1 mole of an 80/20 mixture of 2,4- and 2,6-toluene diamine with about 3.7 moles of ethylene oxide and then about 3.3 moles of propylene oxide.

POLYOL B: a 395 OH number polyol prepared by sequentially reacting 1 mole of a mixture of 2,3- and 3,4-toluene diamine with about 3.5 moles of ethylene oxide and then with about 4.5 moles of propylene oxide.

POLYOL C: Stepanol PS-2502, a 250 OH number aromatic polyester polyol commercially available from Stepan Company.

HCFC-123: ],1-dichloro-2,2,2-trifluoroethane.

HCFC-141b: 1,1-dichloro-1-fluoroethane.

2-MB: 2-methylbutane.

n-P: n-pentane.

L-5440 a polyalkyleneoxidedimethylsiloxane copolymer, commercially available from Union Carbide.

PMDTA: pentamethyldiethylenetriamine.

K-15: Dabco K-15 catalyst, a potassium based catalyst commercially available from Air Products.

TMR-30: Dabco TMR-30 catalyst, an amine catalyst commercially available from Air Products.

DC-193: a siloxane surfactant commercially available from Dow Corning Corporation.

TMEDA: tetramethylethylenediamine.

ISO A: Mondur MR isocyanate, a commercially available polymethylene polyphenyl polyisocyanate from Mobay Corporation, having an NCO content of about 32%.

ISO B: Mondur 489 isocyanate, a commercially available polymethylene polyphenyl polyisocyanate from Mobay Corporation, having an NCO content of about 31%.

In the examples, the HCFC-123 and HCFC-141b were first mixed with the hydrocarbon noted. The ingredients listed o in the Tables under B-side were then blended. The isocyanate was then mixed in a mixing vessel using an air stirrer. After the mix times noted in the Tables, the reaction mixtures were poured into a polyethylene lined 10½"×10½"×2½" cardboard box. The cream times, gel times, densities and K-factors of the systems were as reported in the Tables. In the Tables, Table 2 represents isocyanurate group containing foams. Finally, Examples 1, 4, 7 and 10 were comparative examples.

TABLE 1

|  | 1 | 2 | 3 | 4 | 5 | 6 |
|---|---|---|---|---|---|---|
| B-SIDE |  |  |  |  |  |  |
| POLYOL A, pbw | 33.5 | 33.5 | 33.5 | 36.4 | 36.4 | 36.4 |
| POLYOL B, pbw | 33.5 | 33.5 | 33.5 | 36.4 | 36.4 | 36.4 |
| L-5440, pbw | 1.5 | 1.5 | 1.5 | 1.5 | 1.5 | 1.5 |
| PMTDA, pbw | 2.2 | 2.2 | 2.2 | 2.2 | 2.2 | 2.2 |
| TMEDA, pbw | 1.1 | 1.1 | 1.1 | 1.1 | 1.1 | 1.1 |
| HCFC-123, pbw | 28.2 | 22.38 | 22.38 | — | — | — |
| HCFC-141b, pbw | — | — | — | 22.4 | 18.83 | 18.83 |
| 2-MB, pbw | — | 2.49 | — | — | 2.09 | — |
| n-P, pbw | — | — | 2.49 | — | — | 2.09 |
| A-SIDE |  |  |  |  |  |  |
| ISO-A, pbw | 70.0 | 70.0 | 70.0 | 76.0 | 76.0 | 76.0 |
| RESULTS |  |  |  |  |  |  |
| Mix time, sec. | 4 | 4 | 4 | 4 | 4 | 4 |
| Cream time, sec. | 14 | 11 | 12 | 10 | 9 | 9 |
| Gel time, sec. | 39 | 37 | 39 | 33 | 33 | 33 |
| Density, pcf. | 1.87 | 1.84 | 1.87 | 1.84 | 1.81 | 1.80 |
| K-factor (BTU-in hr-ft2) | 0.120 | 0.126 | 0.127 | 0.122 | 0.127 | 0.128 |

TABLE 2

|  | 7 | 8 | 9 | 10 | 11 | 12 |
|---|---|---|---|---|---|---|
| B-SIDE |  |  |  |  |  |  |
| POLYOL C, pbw | 100.0 | 100.0 | 100.0 | 100.0 | 100.0 | 100.0 |
| K-15, pbw | 3.0 | 3.0 | 3.0 | 3.0 | 3.0 | 3.0 |
| TMR-30, pbw | 0.6 | 0.6 | 0.6 | 0.6 | 0.6 | 0.6 |
| DC-193, pbw | 1.5 | 1.5 | 1.5 | 1.5 | 1.5 | 1.5 |
| HCFC-123, pbw | 45.4 | 36.09 | 36.09 | — | — | — |
| HCFC-141b, pbw | — | — | — | 33.4 | 28.08 | 28.08 |
| 2-MB, pbw | — | 4.01 | — | — | 3.12 | — |
| n-P, pbw | — | — | 4.01 | — | — | 3.12 |
| A-SIDE |  |  |  |  |  |  |
| ISO-A, pbw | 158.5 | 158.5 | 158.5 | 158.5 | 158.5 | 158.5 |
| RESULTS |  |  |  |  |  |  |
| Mix time, sec. | 4 | 4 | 4 | 4 | 4 | 4 |
| Cream time, sec. | 21 | 17 | 20 | 16 | 16 | 16 |
| Gel time, sec. | 35 | 36 | 35 | 30 | 31 | 30 |
| Density, pcf. | 1.97 | 1.94 | 1.95 | 1.88 | 1.82 | 1.82 |
| K-factor (BTU-in hr-ft2) | 0.130 | 0.128 | 0.131 | 0.133 | 0.134 | 0.134 |

TABLE 3

|  | 13 | 14 | 15 | 16 |
|---|---|---|---|---|
| B-SIDE |  |  |  |  |
| POLYOL A, pbw | 33.5 | 36.4 | 33.5 | 36.4 |
| POLYOL B, pbw | 33.5 | 36.4 | 33.5 | 36.4 |
| L-5440, pbw | 1.5 | 1.5 | 1.5 | 1.5 |
| PMTDA, pbw | 2.2 | 2.2 | 2.2 | 2.2 |
| TMEDA, pbw | 1.1 | 1.1 | 1.1 | 1.1 |
| HCFC-123, pbw | 17.74 | — | 24.39 | — |
| HCFC-141b, pbw | — | 15.59 | — | 16.44 |
| 2-MB, pbw | 10.46 | 6.81 | — | — |
| n-P, pbw | — | — | 3.81 | 5.96 |
| A-SIDE |  |  |  |  |
| ISO-A, pbw | 70.0 | 76.0 | 70.0 | 76.0 |
| RESULTS |  |  |  |  |
| Mix time, sec. | 5 | 5 | 5 | 5 |
| Cream time, sec. | 11 | 9 | 13 | 7 |
| Gel time, sec. | 38 | 37 | 38 | 29 |
| Density, pcf. | 1.34 | 1.27 | 1.69 | 1.63 |
| K-factor (BTU-in hr-ft2) | 0.152 | 0.162 | 0.130 | 0.132 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the preparation of closed cell, rigid foams by reacting a) a polyol component having a hydroxyl number of from about 200 to about 650, and b) an organic polyisocyanate, in the presence of c) a catalyst, d) a foam stabilizer, and e) a blowing agent, the improvement wherein the blowing agent comprises a mixture of i) from 30 to 95 percent by weight of a hydrochlorofluorocarbon selected from the group consisting of 2,2-dichlor-1,1,1-trifluoroethane and 1,1-dichloro-1.fluoroethane and ii) from 5 to 70 percent by weight of a hydrocarbon selected from the group consisting of n-pentane, 2-methylbutane, hexane, the position of isomers of hexane and mixtures thereof.

2. The process of claim 1, wherein said blowing agent comprises a mixture of i) from 60 to 90 percent by weight of said hydrochlorofluorocarbon and ii) from 10 to 40 percent by weight of said hydrocarbon.

3. The process of claim 1 wherein said hydrochlorofluorocarbon is 2,2-dichlor-1,1,1-trifluoroethane and 1,1-dichloro-1-fluoroethane and said hydrocarbon is n-pentane.

* * * * *